May 1, 1945.  A. C. CARLSON  2,375,074
MACHINE TOOL
Original Filed June 23, 1941  3 Sheets-Sheet 1

INVENTOR.
ARTIE C. CARLSON
ATTORNEYS

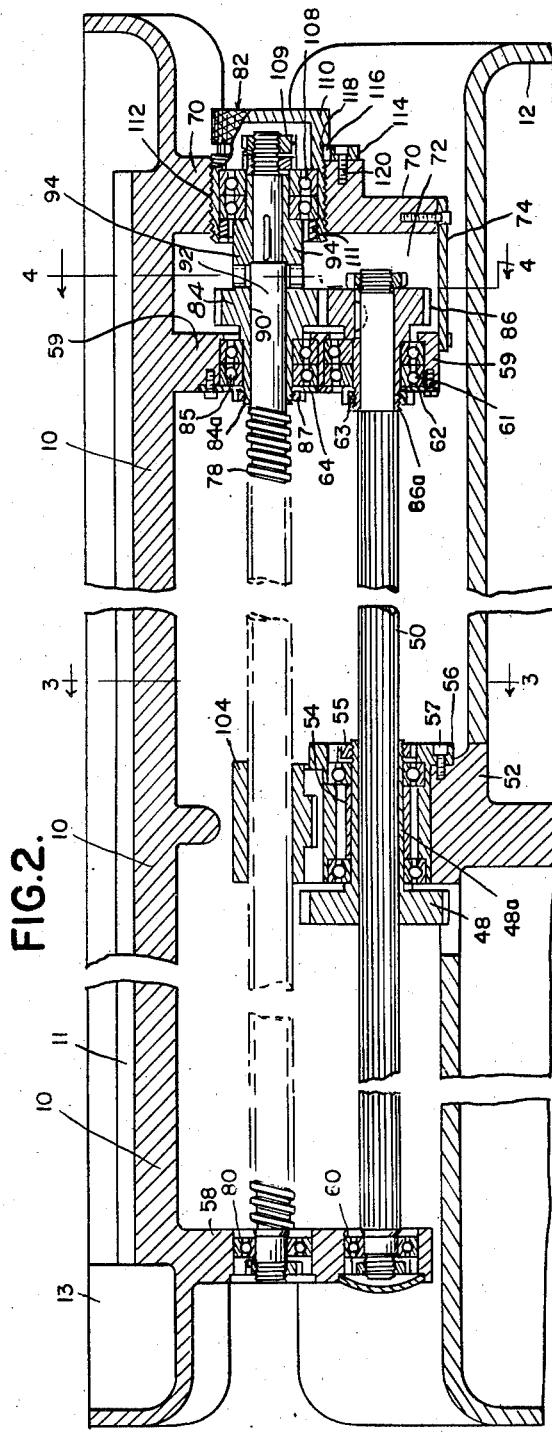

May 1, 1945.  A. C. CARLSON  2,375,074
MACHINE TOOL
Original Filed June 23, 1941  3 Sheets-Sheet 3
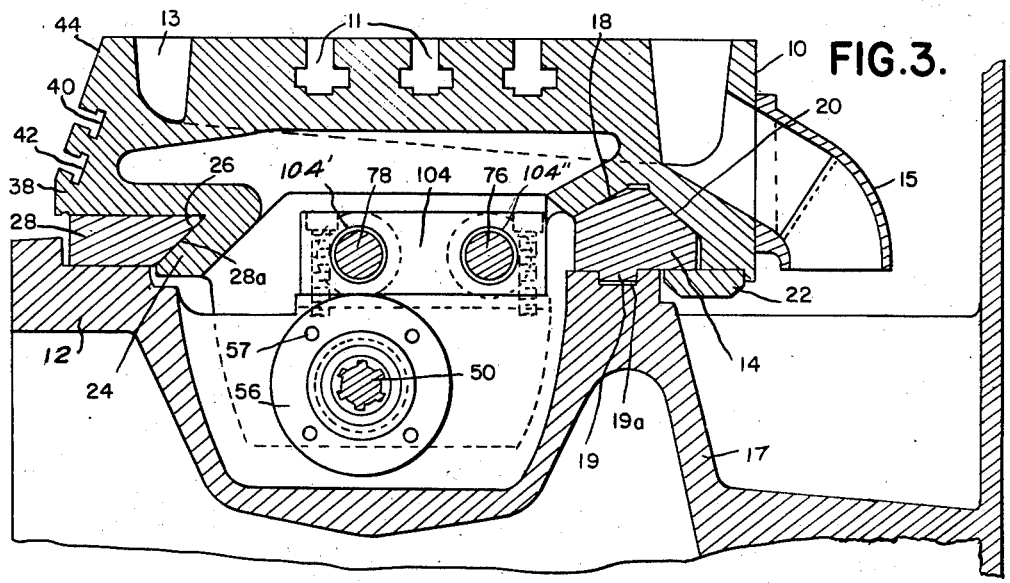
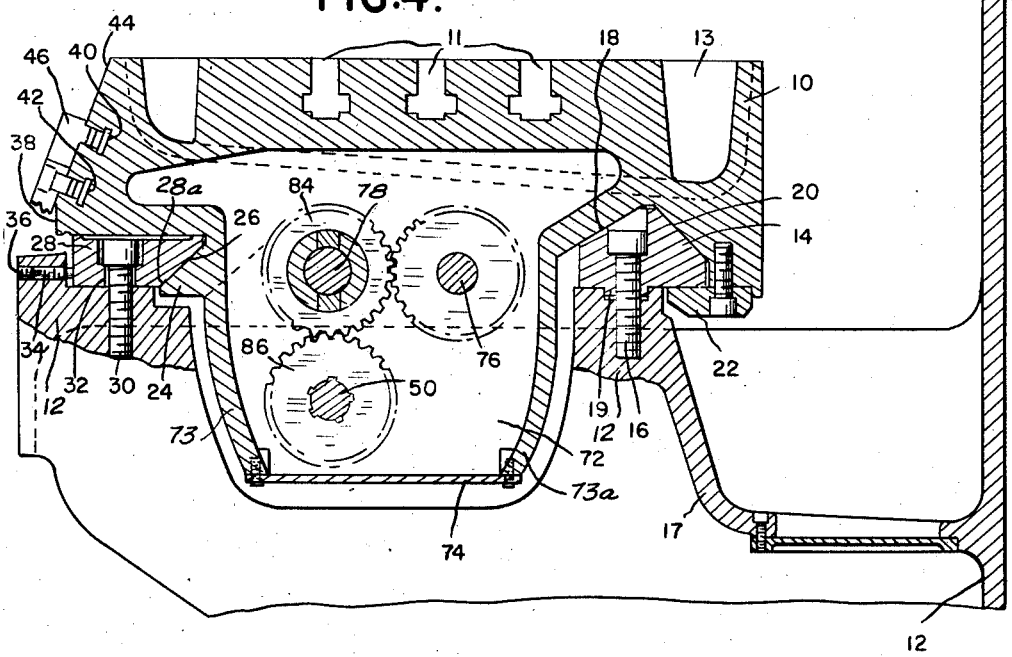
*INVENTOR.*
ARTIE C. CARLSON
BY
ATTORNEYS Patented May 1, 1945

2,375,074

UNITED STATES PATENT OFFICE 2,375,074

MACHINE TOOL

Artie C. Carlson, Detroit, Mich., assignor to Bremacc Corporation, Detroit, Mich., a corporation of Michigan Continuation of application Serial No. 399,361, June 23, 1941. This application January 5, 1944, Serial No. 517,139

13 Claims. (Cl. 90—22)

This invention relates generally to machine tools and constitutes a continuation of my applictaion filed June 23, 1941, bearing Serial No. 399,361.

More particularly, the invention relates to a novel feed mechanism applicable generally to machine tools, but which is illustrated in the present case as applied to a milling machine.

One of the considerations which determines the accuracy and efficiency of machine tools, such for example as milling machines, is the ability of the machine to traverse the table with a minimum of vibration. This is particularly true in downcutting milling machines, in which my table feed is especially valuable.

According to the present invention, novel feeding mechanism is employed which insures great rigidity of the table and reduces vibration to a minimum. The feed is effected through a pair of oppositely threaded feed screws cooperating with a pair of oppositely threaded portions of a single feed nut, the feed screws being respectively right and left hand, and rotated in opposite directions. Means are also provided for effecting a relative adjustment between the feed screws so as to take up any looseness or backlash and to insure a smooth vibrationless feeding movement of the table.

As a specifically different embodiment of the present invention the feeding mechanism may comprise a pair of rigidly mounted feed screws having a rotatable feed nut associated with each screw. The feed nuts may be geared together for simultaneous rotation, either in the same or opposite directions. A relative axial adjustment between one of the feed screws and its corresponding feed nut is provided to take up backlash.

It is accordingly an object of the present invention to provide improved feeding mechanism for machine tools.

More specifically it is an object of the present invention to provide improved feeding mechanism employing a plurality of parallel sets of nut-feed screw elements in which means are provided for effecting a longitudinal adjustment between the elements of one set.

It is a further object of the present invention to provide novel feeding mechanism for machine tools in which a pair of oppositely threaded feed screws cooperate with a pair of oppositely threaded portions of a single feed nut.

It is a further object of the invention to provide novel feeding mechanism for machine tools in which a pair of oppositely rotated right and left hand feed screws are provided, in association with a pair of oppositely threaded portions of a single feed nut, and in which means are provided for effecting a very fine relative adjustment between the feed screws.

Other objects of the invention will be apparent as the description proceeds, and when taken in conjunction with the accompanying drawings, wherein:

Figure 2 is a section on the line 2—2, Figure 1, with parts broken away;

Figure 3 is a section on the line 3—3, Figure 2;

Figure 4 is a section on the line 4—4, Figure 2;

Figure 5 is a side elevation, with parts broken away, of a modified form of my improved feeding mechanism; and Figure 6 is a section on the line 6—6, Figure 5.

Figure 1:
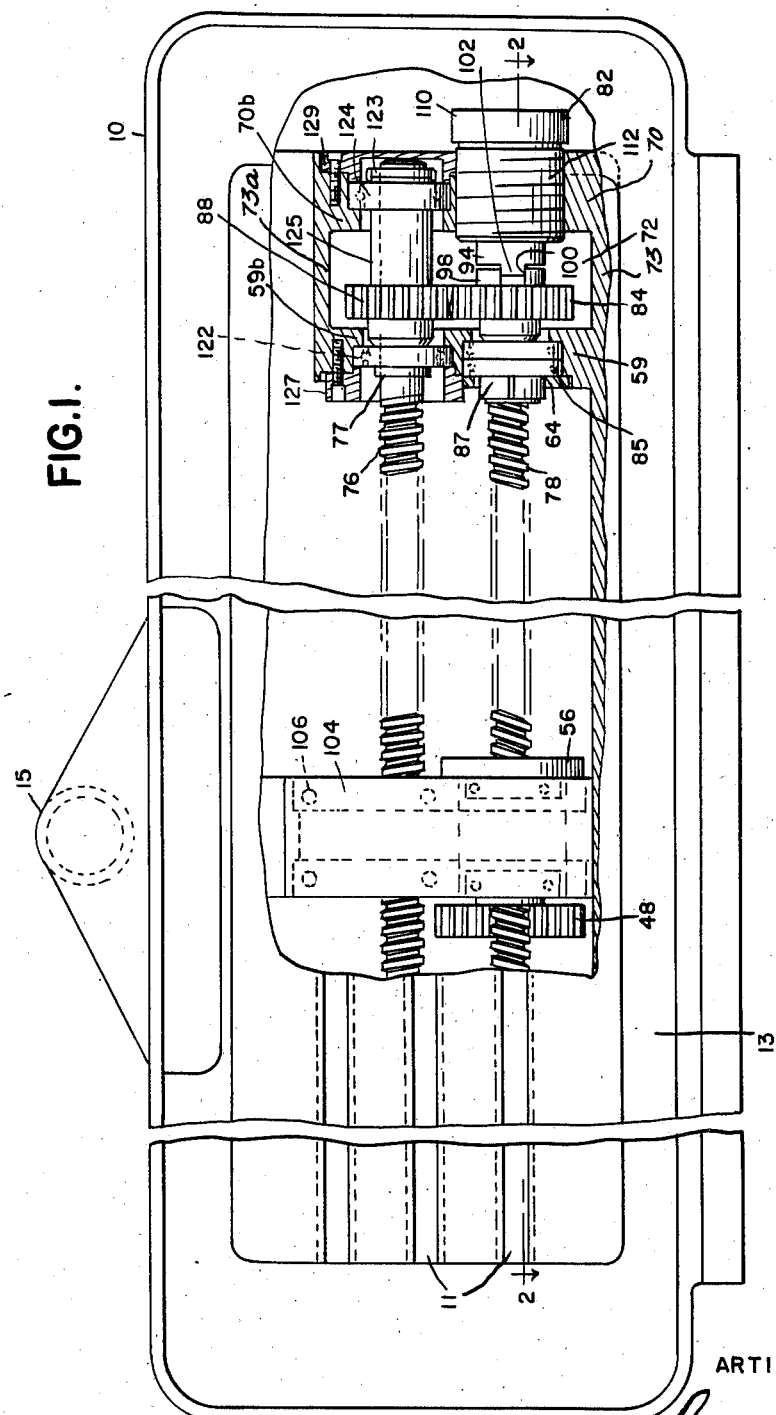
Figure 1 is a plan view of the table provided with feeding mechanism in accordance with the present invention.

According to the present invention a table 10 is mounted for movement over a stationary bed 12. As usual, the table 10 is provided with a plurality of T-slots 11, by means of which a work piece may be secured thereto. As shown in Figure 3, a groove 13 is provided around the periphery of the table 10 and terminates in a spout 15 for discharge of coolant and chips to a receptacle 17 formed as a part of the bed 12.

The bed 12 carries a longitudinally extending guideway 14 that has a key 19 seated in a corresponding groove 19a in the bed 12 and is bolted or otherwise secured to the bed as indicated at 16 in Figure 4. Preferably the guideway 14 has inclined guiding surfaces 18 and 20 respectively. In the present instance the surface 18 is inclined at an angle of approximately 30° to the horizontal, while the surface 20 is inclined at an angle of 45° to the horizontal. This construction is desirable since it contributes to the accurate guiding of the table 10 in its longitudinal movement.

The table 10 has a gib 22 which extends beneath a laterally projecting portion of the guideway 14 and serves to hold the table down onto the guideway 14. The table 10 is provided with accurately formed surfaces cooperating with the surfaces 18 and 20 previously described to effect accurate guided movement of the table 10.

At its opposite side the table 10 is provided with a laterally projecting rib 24 having an upper inclined surface 26. Mounted on the bed 12 is a gib 28 having a surface 28a shaped to correspond to the surface 26. The gib 28 is secured to the bed 12 by means of bolts 30 which pass through enlarged openings 32 in the gib 28. This permits adjustment of the gib 28 before it is rigidly clamped down by bolts 30. Fine lateral adjustment of the gib 28 is effected by means of an adjusting screw 34 received in a tapped opening 36 in the bed 12.

The table 10 has a laterally projecting portion 38 which rests on the top of the adjustable gib 28. By adjusting the gib 28 laterally, the table 10 may be firmly supported and held down while being guided by the surfaces 18 and 20 previously described.

As shown in Figure 4, the table 10 is provided with T-slots 40 and 42 respectively formed in an inclined surface 44 for the reception of conventional actuating elements or dogs 46 which cooperate with suitable control mechanism (not shown).

In order to effect feed and traverse movement of the table 10, a source of power (not shown) is connected to a gear 48 splined upon a spline shaft 50. In Figure 2 I have shown a separate feed train housing 52 for supporting the spline shaft 50 and other mechanism later to be described. The housing 52 is bolted or otherwise secured to the bed 12 by suitable means, or if preferred, it may be cast therewith as an integral part.

A laterally projecting portion 48a of the gear 48 is mounted in a bearing 54 and is retained against axial movement relative thereto by nut 55. Bearing 54 is firmly held in the housing 52 by retainer ring 56 bolted thereto as indicated at 57.

Spline shaft 50 extends between and is carried by depending webs 58 and 59 of the table 10. At the left, as seen in Figure 2, spline shaft 50 is provided with a bearing 60 carried by web 58. At the other end, spline shaft 50 has a gear 86 keyed thereto. Preferably this gear 86 is positioned beside the web 59 and has a laterally projecting tubular portion 86a mounted in a bearing 61 carried by the web 59. Bearing 61 is retained in web 59 by means of a plate 62 and a nut 63. Thus gear 86 is mounted for rotation beside web 59 and is firmly held against axial movement relative thereto.

The table 10 is also provided adjacent the web 59 with another depending web 70, and such webs provide therebetween a space 72. Other depending webs 73 and 73a of the table cooperate with the webs 59 and 70 and with a bottom closure plate 74 to form a transmission housing.

A pair of oppositely threaded feed screws 76 and 78 are provided for the table 10 and extend through and are carried by webs 58, 59 and 70 respectively. As shown in Figure 2, the feed screw 78 is provided in web 58 with bearing 80 which permits limited axial movement of the feed screw 78 therein. The feed screw 78 is further provided in web 70 with an adjusting structure indicated generally at 82 which will hereinafter be described.

The feed screw 78 carries within an opening in the web 59 a laterally extending tubular part 84a of a gear 84 which meshes with the gear 86. Preferably gear 84 is mounted for rotation on screw 78 which in turn is mounted in a bearing 85 in the web 59. Such gear 84 and the bearing 85 therefor are held against axial movement relative to the web 59 by means of a retainer plate 64 and nut 87.

The gear 84 also meshes with an identical gear 88 keyed to feed screw 76. Thus it will be apparent that gears 84 and 88 will rotate in opposite directions and will transmit opposite rotation to their corresponding feed screws.

The feed screw 76 is carried by preloaded bearings 122 and 124 located in the webs 59 and 70 and designed to carry both radial and thrust loads of the feed screw 76. The bearing 122 is located between a shoulder 77 on screw 76 and a shoulder 59b of the web 59. A retainer 127 is bolted to the web 59 to hold the bearing 122 against axial movement relative thereto. The bearing 124 is located between a shoulder 70b of the web 70 and a nut 123 on the screw 76. A spacer 125 is located between the gear 88 and the bearing 124, while a retainer 129 is bolted to the web 70 to hold the bearing 124 against axial movement relative thereto. Thus the bearings 122 and 124, gear 88, spacer 125 and feed screw 76 constitute a rotatable unit that is carried by but is effectively held against axial movement relative to the table 10.

The gear 84 is provided with an internal hardened and ground bore 90 which permits the feed screw 78, which has a correspondingly finished portion 92, to move therein.

For transmitting rotation of the gear 84 to the feed screw 78, a clutch or coupling element 94 is keyed or otherwise secured to the feed screw 78 and is provided with a tongue 102 for clutching engagement with a slot 100 in a laterally projecting tubular part or hub 98 of the gear 84. Thus a driving relationship between the gear 84 and the clutch element 94 on the feed screw 78 is maintained while the feed screw 78 is moved axially relative to the gear 84.

A feed nut 104 is bolted or otherwise secured to the feed train housing 52 as indicated generally at 106 and has a pair of oppositely threaded portions 104' and 104". It will be apparent that rotation of the feed screws 76 and 78 in the threaded portions 104' and 104" of this nut 104 will effect longitudinal movement of the table 10.

In order that the feed screws 76 and 78 may be relatively adjusted so that they will cooperate properly with the feed nut 104, the following means is provided for effecting slight adjustment of the feed screw 78 longitudinally with respect to the table 10. The clutch element 94, as previously described, is keyed or otherwise rigidly secured to the feed screws 78. Bearings 108 are rigidly assembled on clutch element 94 by nuts 109. The bearings 108, in turn, are mounted in an adjusting housing 110, and are assembled therewith by retainer ring 111. The housing 110 is provided as indicated at 112 with threads, by means of which it may be adjusted in opposite directions axially of the web 70 of the table 10. Preferably the threads 112 are a fine pitch so that a very fine axial adjustment of the feed screw 78 in opposite directions may thus be obtained. It will be understood that the bearings 108 when adjusted are effective to bring about corresponding axial adjustment of the feed screw 78.

Means are provided for locking the housing 110 in adjusted position and comprises a locking element 114 having a projecting tang 116 adapted to be received within a corresponding slot 118 formed in the periphery of the housing 110. The locking element 114 is fastened to the table 10 by a bolt 120, and a plurality of slots 118 are provided around the periphery of the housing for the reception of the tang 116.

With the foregoing structure in mind, the operation of the mechanism will be briefly described. Feed screws 76 and 78 will engage with the fed nut 104. Feed screw 76 is carried by but is rigidly supported against axial movement relative to the table 10. Feed screw 78 is also carried by the table 10 and is adjusted in opposite directions by means of the adjusting mechanism indicated generally at 82, including the housing 110, so that a proper relationship exists between feed screws 76 and 78 and the feed nut 104. It will be appreciated that by virtue of the adjustment of the feed screw 78 in opposite directions it will be possible to eliminate substantially all backlash and looseness in the driving connection, at the same time to prevent binding of the parts.

Power from any suitable source is transmitted to the gear 48 by means of a drive gear (not shown). Due to the spline connection between the gear 48 and the spline shaft 50, the shaft 50 is rotated, thereby rotating the gear 86. Rotation of the gear 86 results in corresponding rotation of the gear 84 which, in turn, drives the coupling element 94 through the tongue 102 formed thereon and the slot 100 formed in the hub 98 of the gear 84. In this connection it will be noted that the relation of the tongue 102 and slot 100 is such that the proper clutching relation is maintained during adjustment of the housing 110 relative to the web 70 of the table. Rotation of the clutch element 94 is imparted to the feed screw 78. At the same time, rotation of the gear 84 results in corresponding rotation in a reverse direction of the gear 88. The gear 88 is keyed to feed screw 76, and accordingly feed screws 76 and 78 will rotate at equal speeds in opposite directions in the threaded portions 104' and 104'' of the feed nut 104 that is fixed relative to the bed 12. Since the feed screws 76 and 78 are of opposite hand, their rotation in opposite directions cooperates to produce a feeding movement of the table 10 on the bed 12.

Referring now to Figures 5 and 6, I have illustrated a modification of my invention wherein the operating principle is the same, but the relationship between the feed screws and feed nuts is reversed.

In these figures I have illustrated a bed 150 on which the table 151 is mounted for reciprocation. Suitable ways, which may be like those shown in Figures 3 and 4, are provided.

Extending upwardly from the bed 150 are a pair of brackets 152, which may be formed integrally with the bed but which preferably are separate elements bolted or otherwise secured thereto. Intermediate the brackets 152 are mounted a pair of feed nuts 153, best seen in Figure 6. The feed nuts 153 are mounted for rotation between the brackets 152 and are rigidly secured against axial movement relative thereto. For this purpose nuts 153 are provided with shoulders 154, against which bearings 155 are retained as by means of the lock nuts 156. Bearings 155 are rigidly supported in the brackets 152 by retainer plates 157 bolted or otherwise secured thereto.

At the opposite end of nuts 153 I provide bearings 158 rigidly assembled thereon by means of lock nuts 159 and spacers 160. Bearings 158 are retained in right-hand bracket 152, as seen in Figure 6, by means of retainer plates 161 bolted or otherwise rigidly secured thereto.

The nuts 153 are each provided with a gear 162, keyed thereto as indicated at 163, and the gears 162 are retained firmly against the shoulders 154 through the spacers 160, bearings 158, and nuts 159.

By this construction the feed nuts 153 are both firmly retained against axial shifting while being mounted for substantially free rotation.

The gears 162 are identical, so that when one of said gears 162 is driven the other gear 162 will be driven thereby in the opposite direction at the same speed.

The table 151 has webs 165 at opposite ends thereof between which are supported the feed screws 166 and 167. As shown in Figure 6, the feed screw 166 is right-hand and feed screw 167 is left-hand. It will be appreciated that the feed nuts 153 cooperating therewith are formed with threads adapted to cooperate with the threads formed on the corresponding feed screws. The feed screws 166 and 167 are supported against rotation at their left-hand end, as seen in Figure 6, by elements 168 which have splined connections with the ends of the feed screws, as indicated at 169. Elements 168 are seated in openings in the web 165 and are retained therein against rotation by suitable securing means, such as the bolts indicated at 170. One of the feed screws, as for example the right-hand feed screw 166 is rigidly supported between the webs 165, and for this purpose is provided with an integral collar 171 and a threaded end portion 172 on which is a clamping nut 173. The feed screw 166 is thus rigidly supported against axial movement by the clamping action between collar 171 and the nut 173.

The other feed screw 167 is mounted for limited axial adjustment without rotation, and for this purpose is provided with a collar 175 and a threaded end portion 176. An adjusting element 177 is threaded within an opening 178 formed in the right-hand web 165 of the table 151. Preferably the threads on the adjusting element 177 are of fine pitch so that a very fine adjustment may be effected by rotation of the adjusting element 177. The adjusting element 177 is adapted to be locked in adjusted position by a locking member 180, which may be identical with the locking element 114 shown in Figure 2. The adjusting element 177 has a recess 181 into which the threaded end 176 of the feed screw extends. A clamping nut 182 and a locking nut 183 are threaded on the end 176 of the feed screw, and are adapted to retain the feed screw 167 against axial displacement relative to the adjusting element 177.

In order to effect adjustment of the feed screw 167, nuts 182 and 183 are loosened and the adjusting element 177 is then rotated in the threaded opening 178 to effect axial displacement thereof. When it has been properly located, nuts 182 and 183 are tightened, thus locking feed screw 167 in adjusted position.

As best seen in Figure 5, a gear 185 is provided in mesh with one of the gears 162 and is adapted to rotate the said gear 162 directly and to rotate the other gear 162 by reason of the meshed engagement between gears 162. Rotation of gears 162 imparts like rotation to the feed nuts 153, as will be evident. The gear 185 is driven from any suitable feed mechanism, such for example as a motor and a train of gearing.

While the two embodiments of my invention illustrated and described in the foregoing show a right-hand and a left-hand feed screw and a feed nut combination, it will be apparent that the same result can be obtained by employing a feed screw-feed nut combination, both of which are of the same hand. If the combinations are of the same hand, an idler gear will be interposed between the gears interconnecting the feed screws for rotation, as shown in Figures 1 to 4, or between the gears interconnecting the feed nuts for rotation, as disclosed in Figures 5 and 6. The effect of the idler gear, as will be obvious, is to provide rotation of the same hand to the rotatable feed screw or feed nut element. In all cases, of course, the feed nuts and feed screws are of the same pitch.

Since my invention is primarily in the feeding mechanism for a table, I have not shown a complete machine, and it will be understood that the invention is applicable to machine tools generally where it is desired to effect the uniform and smooth translation of a table or carriage.

While I have illustrated and described two preferred forms of feeding mechanism, it will be appreciated that this has been done solely to enable those skilled in the art to practice the present invention, the scope of which is indicated by the appended claims.

What I claim as my invention is:

1. In a machine tool, a movable work carrier, a support for said carrier, and mechanism for moving the carrier over said support, including a feed nut having a pair of oppositely threaded portions, and carried by and axially immovable relative to said support, a rotatable gear carried by and axially immovable relative to said support, a spline shaft movable with the carrier and extending axially through the gear to be rotated thereby, a pair of oppositely threaded feed screws movable with the carrier in substantially parallel relation to said spline shaft and engaging said threaded portions of the feed nut whereby rotation of said feed screws relative to said nut imparts movement to the carrier, and means for driving the feed screws from said spline shaft.

2. In a machine tool, a movable work table, a bed for supporting said table, and mechanism for moving the table over said bed, including a feed nut rigid with said bed and having a pair of oppositely threaded portions, a gear rotatably mounted upon said bed and axially immovable, a spline shaft carried by and movable with the table and extending axially through the gear to be rotated thereby, a pair of oppositely threaded feed screws carried by and movable with the table in substantially parallel relation to said spline shaft and engaging said threaded portions of the feed nut whereby rotation of said feed screws relative to said nut imparts movement to the table, and means including a single gear train for driving the feed screws from said spline shaft.

3. In a machine tool, a movable work carrier, a support for said carrier, and mechanism for moving the carrier over said support, including a feed nut having a pair of oppositely threaded portions and carried by and axially immovable relative to said support, a rotatable gear carried by and axially immovable relative to said support, a spline shaft movable with the carrier and extending axially through the gear to be rotated thereby, a pair of oppositely threaded feed screws movable with the carrier in substantially parallel relation to said spline shaft and engaging said threaded portions of the feed nut whereby rotation of said feed screws relative to said nut imparts movement to the carrier, means for driving the feed screws from said spline shaft, and means on one of said feed screws adjustable relative to said carrier to take up backlash in said feed screw.

4. In a machine tool, a movable work carrier, a support for said carrier, and mechanism for moving the carrier over said support, including a feed nut having a pair of oppositely threaded portions and carried by and axially immovable relative to said support, a rotatable gear carried by and axially immovable relative to said support, a spline shaft movable with the carrier and extending axially through the gear to be rotated thereby, a pair of oppositely threaded feed screws movable with the carrier in substantially parallel relation to said spline shaft and engaging said threaded portions of the feed nut whereby rotation of said feed screws relative to said nut imparts movement to the carrier, means for driving the feed screws from said spline shaft, and means for effecting a relative adjustment between the feed screws to take up looseness and backlash.

5. In a machine tool, a movable work carrier, a support for said carrier, and mechanism for moving the carrier over said support, including a feed nut having a pair of threaded portions and carried by and axially immovable relative to said support, a rotatable gear carried by and axially immovable relative to said support, a spline shaft movable with the carrier and extending axially through the gear to be rotated thereby, a pair of threaded feed screws movable with the carrier in substantially parallel relation to said spline shaft and engaging said threaded portions of the feed nut whereby rotation of said feed screws relative to said nut imparts movement to the carrier, means for driving the feed screws from said spline shaft, and means carried by the carrier and operable relative thereto to adjust one of the feed screws in opposite directions to take up backlash.

6. In a machine tool, a movable work table, a support for said table, and mechanism for moving the table over said support, including a feed nut having a pair of oppositely threaded portions and carried by and axially immovable relative to said support, a rotatable gear carried by and axially immovable relative to said support, a spline shaft carried by and movable with said table, said spline shaft extending axially through the gear to be rotated thereby, a pair of oppositely threaded feed screws carried by and movable with the table in substantially parallel relation to said spline shaft, said feed screws engaging said threaded portions of the feed nut whereby rotation of said feed screws relative to said nut imparts movement to the table, a gear free upon one of said feed screws, a gear on the spline shaft meshing with the free gear to drive the same, a gear on the second feed screw meshing with and operable by the free gear to drive said second feed screw, and means including cooperating clutch elements on the first mentioned feed screw for driving the first feed screw from the free gear.

7. In a machine tool, a movable work table, a support for said table, and mechanism for moving the table over said support, including a feed nut having a pair of threaded portions and carried by and axially immovable relative to said support, a rotatable gear carried by and axially immovable relative to said support, a spline shaft carried by and movable with said table, said spline shaft extending axially through the gear to be rotated thereby, a pair of threaded feed screws carried by and movable with the table in substantially parallel relation to said spline shaft, said feed screws engaging said threaded portions of the feed nut whereby rotation of said feed screws relative to said nut imparts movement to the table, a gear free upon one of said feed screws, a gear on the spline shaft meshing with the free gear to drive the same, a gear on the second feed screw meshing with and operable by the free gear to drive said second feed screw, means including cooperating clutch elements on the first mentioned feed screw for driving the first feed screw from the free gear, and adjustable means carried by the table for adjusting the first feed screw axially in opposite directions to take up backlash, the cooperating clutch elements being constructed and arranged whereby the driving connection between the free gear and first mentioned feed screw is maintained during adjustment of the first feed screw by the adjustable means aforesaid.

8. In a machine tool, a movable work table, a support for said table, and mechanism for moving the table over said support including a feed nut having a pair of oppositely threaded portions and carried by and axially immovable relative to said support, a bearing carried by and axially immovable relative to said support, a rotatable gear having a supporting portion extending through and axially immovable relative to said bearing, a spline shaft carried by and movable with the table, said spline shaft extending axially through the gear to be rotated thereby, a pair of oppositely threaded feed screws carried by and movable with the table in substantially parallel relation to said spline shaft, said feed screws engaging said threaded portions of the feed nut whereby rotation of said feed screws relative to said nut imparts movement to the table, and means for driving the feed screws from said spline shaft.

9. In a machine tool, a movable table, a support therefor, and means for moving the table over said support, including a rotatable splined shaft carried by and movable with the table, a drive gear splined upon said shaft and operable to rotate the same, said drive gear being carried by and axially immovable relative to said support, a second gear upon said shaft to be rotated thereby, a pair of substantially parallel threaded feed screws carried by and movable with the table in substantially parallel relation to said splined shaft, one of said feed screws being adjustable axially in opposite directions relative to said table to take up backlash, meshing gears on said feed screws, one being secured to one of said feed screws, and the other being free upon the other of said feed screws and meshing with the second gear aforesaid to be driven thereby, a clutch for establishing a driving connection between the free gear and the feed screw upon which it is mounted, said clutch being operable to maintain such driving connection during axial adjustment of the adjustable screw, and a feed nut rigid with the support and having a pair of threaded portions engaged by said feed screws whereby rotation of said feed screws relative to said nut imparts movement to the table relative to the support.

10. In a machine tool, a movable table, a support therefor, and means for moving the table over said support, including a rotatable splined shaft carried by and movable with the table, a drive gear splined upon said shaft and operable to rotate the same, said drive gear being carried by and axially immovable relative to said support, a second gear upon said shaft to be rotated thereby, a pair of substantially parallel threaded feed screws carried by and movable with the table in substantially parallel relation to said splined shaft, one of said feed screws being adjustable axially in opposite directions relative to said table to take up backlash, meshing gears on said feed screws, one being secured to one of said feed screws, and the other being free upon the other of said feed screws and meshing with the second gear aforesaid to be driven thereby, a clutch for establishing a driving connection between the free gear and the feed screw upon which it is mounted, said clutch being operable to maintain such driving connection during axial adjustment of the adjustable feed screw, a feed nut rigid with the support and having a pair of threaded portions engaged by said feed screws whereby rotation of said feed screws relative to said nut imparts movement to the table relative to the support, and means for synchronizing movement of said feed screws, including means carried by said table for adjusting axially in opposite directions the axially adjustable feed screw relative to said table.

11. In a machine tool, a movable table, a support therefor, and means for moving the table over said support, including a rotatable splined shaft carried by and movable with the table, a drive gear splined upon said shaft and operable to rotate the same, said drive gear being carried by and axially immovable relative to said support, a second gear upon said shaft to be rotated thereby, a pair of substantially parallel threaded feed screws carried by and movable with the table in substantially parallel relation to said splined shaft, one of said feed screws being adjustable axially in opposite directions relative to said table to take up backlash, meshing gears on said feed screws, one being secured to one of said feed screws, and the other being free upon the other of said feed screws and meshing with the second gear aforesaid to be driven thereby, a clutch for establishing a driving connection between the free gear and the feed screw upon which it is mounted, said clutch being operable to maintain such driving connection during axial adjustment of the adjustable feed screw, a feed nut rigid with the support and having a pair of threaded portions engaged by said feed screws whereby rotation of said feed screws relative to said nut imparts movement to the table relative to the support, means for synchronizing movement of said feed screws, including means carried by said table for adjusting axially in opposite directions the axially adjustable feed screw relative to said table, and means carried by the table for locking the adjusting means in adjusted position.

12. In feeding mechanism of the character described, a support, a feed screw, a gear loosely mounted on said feed screw, means mounting said gear on said support for rotation only, means mounting said feed screw on said support for rotation and for limited axial movement, a driving coupling rigidly secured to said feed screw having portions engageable by said gear throughout a range of relative axial adjustment therebetween, a bearing rigidly retained against axial movement on said coupling, a bearing housing in which said bearing is rigidly retained against axial movement, and means for mounting said bearing housing for adjustment whereby it may effect axial adjustment of said feed screw.

13. In feeding mechanism of the character described, a support, a feed screw, a gear loosely mounted on said feed screw, means mounting said gear on said support for rotation only, means mounting said feed screw on said support for rotation and for limited axial movement, a driving coupling rigidly secured to said feed screw having portions engageable by said gear throughout a range of relative axial adjustment therebetween, a bearing rigidly retained against axial movement on said coupling, a bearing housing in which said bearing is rigidly retained against axial movement, said support having an internally threaded opening aligned with said feed screw, said housing being externally threaded and adjustably positioned in said opening to effect axial adjustment of said feed screw.

ARTIE C. CARLSON.